United States Patent
Ohba et al.

(10) Patent No.: US 9,027,435 B2
(45) Date of Patent: May 12, 2015

(54) CONTROL CABLE ATTACHMENT STRUCTURE

(75) Inventors: Toshiya Ohba, Wako (JP); Nozomi Watanabe, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/976,131

(22) PCT Filed: Nov. 16, 2011

(86) PCT No.: PCT/JP2011/076362
§ 371 (c)(1),
(2), (4) Date: Jun. 26, 2013

(87) PCT Pub. No.: WO2012/090610
PCT Pub. Date: Jul. 5, 2012

(65) Prior Publication Data
US 2013/0269470 A1    Oct. 17, 2013

(30) Foreign Application Priority Data
Dec. 27, 2010   (JP) .................................. 2010-290816

(51) Int. Cl.
*F16C 1/10*   (2006.01)
*F16C 1/26*   (2006.01)

(52) U.S. Cl.
CPC ........... *F16C 1/102* (2013.01); *Y10T 74/20462* (2015.01); *F16C 1/105* (2013.01); *F16C 1/262* (2013.01)

(58) Field of Classification Search
USPC ................ 74/502.4, 502.6; 403/197; 248/56
See application file for complete search history.

(56) References Cited

U.S. PATENT DOCUMENTS 5,347,882 A * 9/1994 Klotz ........................... 74/502.4
6,971,816 B2 * 12/2005 Miyagawa et al. ........... 403/397

FOREIGN PATENT DOCUMENTS

| | | | |
|---|---|---|---|
| FR | 2899657 A1 * | 10/2007 | ............... F16C 1/26 |
| JP | H01-149536 | 10/1989 | |
| JP | 08-135645 | 5/1996 | |
| JP | 10-110718 | 4/1998 | |
| JP | 2003-239937 | 8/2003 | |
| JP | 4015437 | 9/2007 | |

* cited by examiner

*Primary Examiner* — Thomas Diaz
(74) *Attorney, Agent, or Firm* — Rankin, Hill & Clark LLP

(57) ABSTRACT

A control cable attachment structure for attaching a control cable to an anchoring member. A plate-part-side attachment groove, includes an anchoring groove in which an attachment part is positioned and anchored, and a constricted part that is connected to the anchoring groove and is narrower than the anchoring groove. The attachment part of the control cable has an engaging part that is engaged by the anchoring groove and is wider than the constricted part, an approximately parallel pair of opposing surfaces respectively opposing the front and rear of a plate surface of the anchor plate part, and an anchoring groove, the surface of which is formed by the pair of opposing surfaces, and in which the peripheral parts of the plate-part-side attachment grove of the anchor plate part engage. The one opposing surface is provided with a protruding part that protrudes toward the other opposing surface.

16 Claims, 13 Drawing Sheets

(a) EMBODIMENT (b) COMPARATIVE EXAMPLE

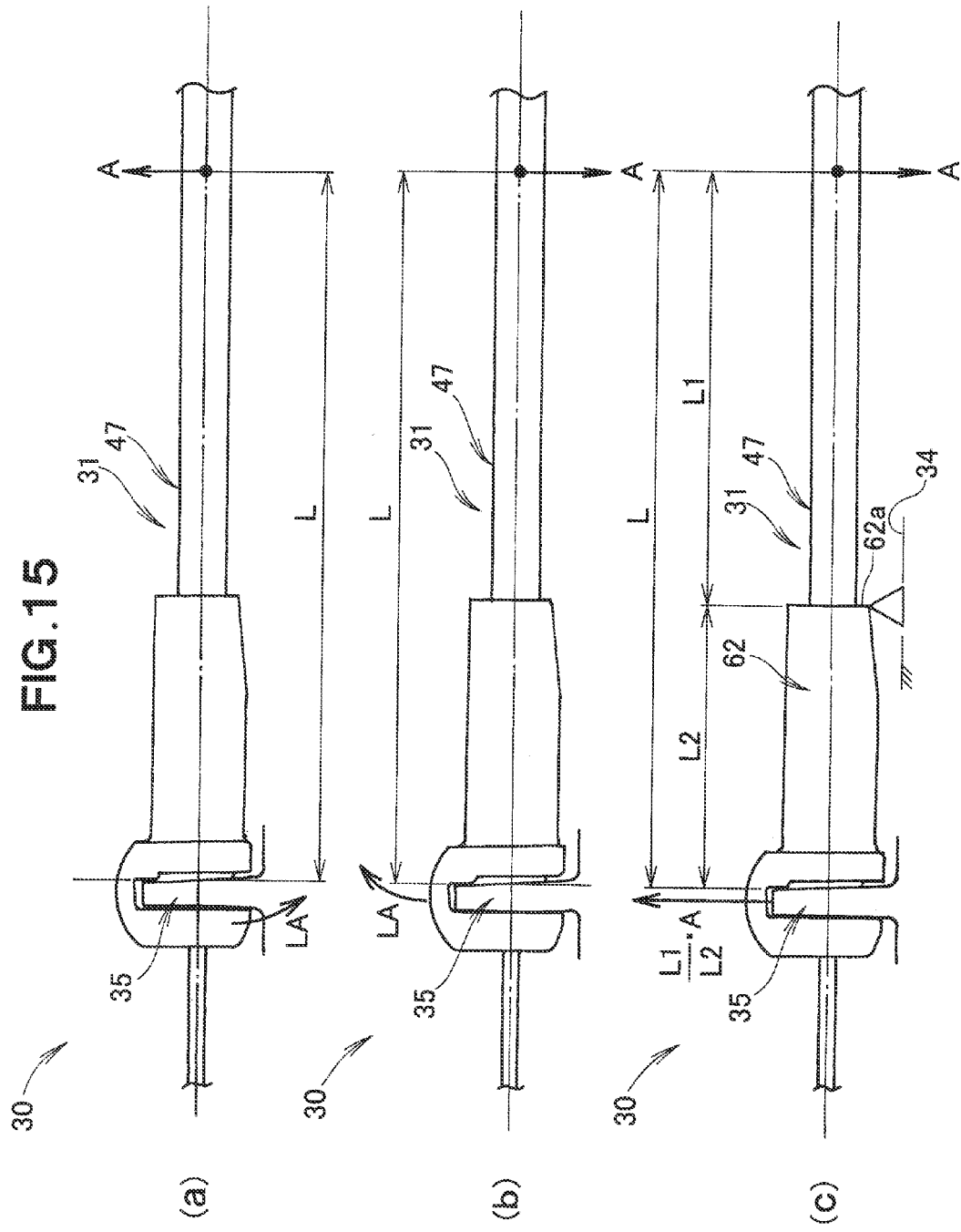

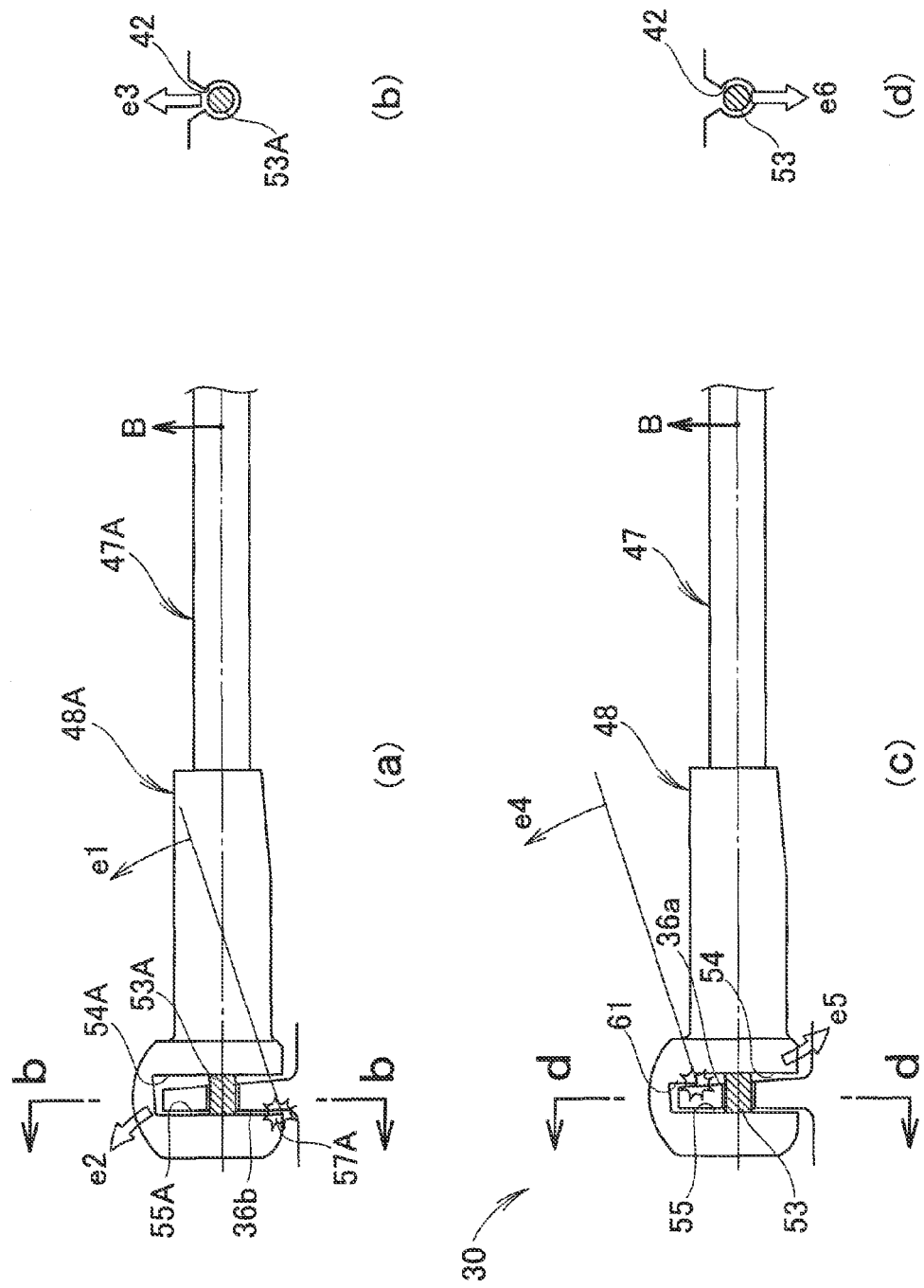

CONTROL CABLE ATTACHMENT STRUCTURE

TECHNICAL FIELD

The present invention relates to a control cable attachment structure including a control cable having an outer tube and an inner cable inserted through the outer tube, and an anchoring member anchoring an attachment part provided on a leading end of the outer tube.

BACKGROUND ART

A control cable attachment structure including an anchoring member and an attachment part (a conduit anchoring part) of a control cable attached to the anchoring member is known as disclosed in patent literature 1 below.

The anchoring member includes a base piece disposed in parallel to an axis of the control cable, and a perpendicular piece disposed at a right angle to the base piece. The perpendicular piece has a C-shaped cutout. The base piece has an opening portion communicating with the cutout of the perpendicular piece. The attachment part of the control cable has an engagement groove for engagement with the cutout of the perpendicular piece, and a flange and lugs for sandwiching a peripheral edge of the opening portion of the base piece.

As for the control cable attachment structure disclosed in patent literature 1, that is, the attachment part is anchored to the anchoring member by engaging the engagement groove of the attachment part with the cutout of the anchoring member and sandwiching the peripheral edge of the opening portion of the base piece between the flange and each of the lugs.

In the manner as stated above, the attachment part can be more rigidly attached to the anchoring member.

By sandwiching the base piece between the flange and each of the lugs of the attachment part, it is possible to easily anchor the control cable to the anchoring part.

However, the control cable attachment structure is complicated due to the base and perpendicular pieces of the anchoring member and the flange and lugs of the attachment part of the control cable.

To improve work efficiency or simplify the structure, for example, it may be suggested that the anchoring member retain the attachment part of the control cable only by engagement of the engagement groove of the attachment part with the cutout of the perpendicular piece. In this case, merely pulling the control cable in a direction in which the cutout of the perpendicular piece is opened does not remove the attachment part because the C-shaped cutout of the perpendicular piece tapers such that the attachment part is not removed therefrom unless a certain degree of load is applied to the attachment part.

The attachment portion may tilt when a load is applied to a point of the control cable, which point is distant from the attachment portion. In this case, the attachment portion has a fulcrum at a bottom point (below the engagement groove engaged with the C-shaped cutout). As a result, the attachment part of the control cable may be undesirably removed from the anchoring member under only a small load in accordance with "principle of the lever".

PRIOR ART LITERATURE

Patent Literature

Patent Literature 1: JP-B-4015437

SUMMARY OF INVENTION

Technical Problem

It is an object of the present invention is to provide a control cable attachment structure which is simplified and designed to prevent removal of a control cable by tilting of the control cable.

Solution to Problem

According to one aspect of the present invention, as defined in claim 1, there is provided a control cable attachment structure comprising: a control cable comprising an outer tube and an inner cable inserted through the outer tube; and an anchoring member anchoring an attachment part provided on a leading end of the outer tube; the anchoring member comprising an anchoring plate portion having a shape of a substantially flat plate, and an attachment groove extending through the anchoring plate portion in a direction perpendicular to a plane of the anchoring plate portion, the attachment groove being opened toward one side edge of the anchoring plate portion, the attachment groove comprising an anchoring groove positioning and anchoring the attachment part, and a constricted groove formed between the anchoring groove and the one side edge of the anchoring plate portion, the constricted groove having a width smaller than a width of the anchoring groove; the attachment part comprising an engaged portion engaged with the anchoring groove and having a dimension larger than the width of the constricted groove, a pair of opposed surfaces protruding from an outer surface of the engaged portion in substantially parallel to each other, the pair of opposed surfaces being opposed to front and back surfaces of the anchoring plate portion, and an engaged groove defined by the pair of opposed surfaces and engaged with peripheral edges of the attachment groove of the anchoring plate portion, wherein at least one of the pair of opposed surfaces includes a protruding portion protruding toward an opposite one of the pair of opposed surfaces, the protruding portion being located closer to the one side edge of the anchoring plate portion than a boundary between the constricted groove and the anchoring groove.

Preferably, as defined in claim 2, the anchoring member includes an general surface extending in a direction perpendicular to the plane of the anchoring plate portion, and the anchoring plate portion is connected to the general surface at a side thereof located oppositely from the one side edge. The attachment part further includes an extension portion extending from either one of the pair of opposed surfaces or the opposite one of the pair of opposed surfaces in a direction away from the engaged groove and along the general surface, the protruding portion being formed on the one of the pair of opposed surfaces. A distance between the protruding portion and the opposite one of the pair of opposed surfaces is set to allow the protruding portion and the opposite one of the pair of opposed surfaces to come into abutment on the front and back surfaces of the anchoring plate portion, respectively, before a distal end of the extension portion abuts on the general surface when the control cable tilts in such a manner as to bring the distal end of the extension portion close to the general surface.

Preferably, as defined in claim 3, the distal end of the extension portion has a flat, beveled portion only at a side thereof facing the general surface.

Preferably, as defined in claim 4, the front surface of the anchoring plate portion faces the protruding portion and slants such that the anchoring plate portion has a thickness increasing from the one side edge toward the general surface.

Preferably, as defined in claim 5, the protruding portion has an inclined surface along the slanting front surface.

Preferably, as defined in claim 6, the attachment part includes a first connection portion located outwardly of the one side edge and interconnecting the pair of opposed surfaces.

Preferably, as defined in claim 7, the attachment part includes a second connection portion interconnecting the pair of opposed surfaces and inserted through the constricted groove with the engaged portion being anchored to the anchoring groove.

Advantageous Effects of Invention

As defined in claim 1, the attachment part has the protruding portion at the at least one of the opposed surfaces, and the protruding portion protrudes toward an opposite one of the opposed surfaces and is located closer to the one side edge of the anchoring plate portion than the boundary between the constricted groove and the anchoring groove. The engaged groove has a smaller width at the protruding portion than at locations other than the protruding portion, such that, when the control cable tilts, the attachment part abuts on the anchoring plate portion above the boundary between the constricted groove and the anchoring groove (above a location of the attachment part where the engaged portion is anchored to the anchoring groove). That is, when the control cable tilts to apply a load to the engaged portion in such a direction as to remove the engaged portion from the anchoring groove, either the protruding portion or an opposite one of the opposed surfaces bends the anchoring plate portion, producing the friction force therebetween. This friction force assists a retaining force produced only at the engaged portion. Thus, it is possible to prevent removal of the engaged portion from the anchoring groove by the tilting of the control cable. Furthermore, the control cable attachment structure is simplified because the at least one of the opposed surfaces is merely provided with the protruding portion protruding toward an opposite one of the opposed surfaces and located closer to the one side edge than the boundary between the constricted groove and the anchoring groove.

As defined in claim 2, the protruding portion is formed on the one of the pair of opposed surfaces. The distance between the protruding portion and the opposite one of the pair of opposed surfaces is set to allow the protruding portion and the opposite one of the pair of opposed surfaces to come into abutment on the front and back surfaces of the anchoring plate portion, respectively, before the distal end of the extension portion abuts on the general surface when the control cable tilts in such a manner as to bring the distal end of the extension portion close to the general surface. Even when the distal end of the extension portion abuts on the general surface and acts as a fulcrum to apply a load to the engaged portion in such a direction as to remove the engaged portion from the anchoring groove in accordance with the "principle of the lever", either the opposite one of the opposed surfaces or the protruding portion bends the anchoring plate portion, producing the friction force therebetween. This friction force assists the retaining force produced only at the engaged portion. Thus, it is possible to prevent removal of the engaged portion from the anchoring groove by tilting the control cable to apply the load to the engaged portion in accordance with the "principle of the lever".

As defined in claim 3, since the flat, beveled portion is formed only at the side of the distal end facing the general surface, a distance between the distal end and the general surface is so great as to prevent the distal end from abutting on the general surface. Even if the distal end abuts on the general surface, the distal end contacts the general surface along a line or surface of the distal end such that a load applied to the extension portion through the outer tube may be easily transmitted to the general surface, thereby reducing a force produced in accordance with the "principle of the lever". Additionally, since the distal end of the extension portion is beveled only at the side facing the general surface, reduction in rigidity of the distal end can be minimized.

As defined in claim 4, the front surface of the anchoring plate portion faces the protruding portion and slants such that the anchoring plate portion has the thickness increasing from the one side edge toward the general surface. The front surface facing the protruding portion slants in such a manner as to allow insertion of the control cable, thereby eliminating concern that the control cable 31 can be less smoothly inserted with the protruding portion being caught on a tip of the anchoring plate portion.

As defined in claim 5, the protruding portion has the inclined surface along the slanting front surface to lessen a clearance defined between the anchoring plate portion and the protruding portion. The protruding portion can contact the slanting front surface along the inclined surface, such that the protruding portion can bend the anchoring plate portion, producing a greater friction force therebetween. The production of this greater friction force increases the retaining force during tilting of the control cable.

As defined in claim 6, the attachment part includes the first connection portion located outwardly of the one side edge and interconnecting the pair of opposed surfaces. The first connection portion prevents the pair of opposed surfaces from moving away from each other. The presence of the first connection portion makes it easier to identify which direction of insertion of the attachment part into the anchoring groove, thereby improving workability in attaching the control cable.

As defined in claim 7, the attachment part includes the second connection portion interconnecting the pair of opposed surfaces and inserted through the constricted groove with the engaged portion being anchored to the anchoring groove. The second connection portion prevents the pair of opposed surfaces from moving away from each other. The second connection portion also prevents the control cable from rotating.

BRIEF DESCRIPTION OF DRAWINGS

FIGS. 15(a)-15(c) are elevation views showing different external forces applied to a control cable; and FIGS. 16(a)-16(d) are elevation views showing that a function of the control cable under an external force varies depending upon whether or not the cable cap includes a protruding portion.

DESCRIPTION OF EMBODIMENTS

A certain preferred embodiment of the present invention is described below with reference to the accompanying drawings.

Embodiment

Figure 1:
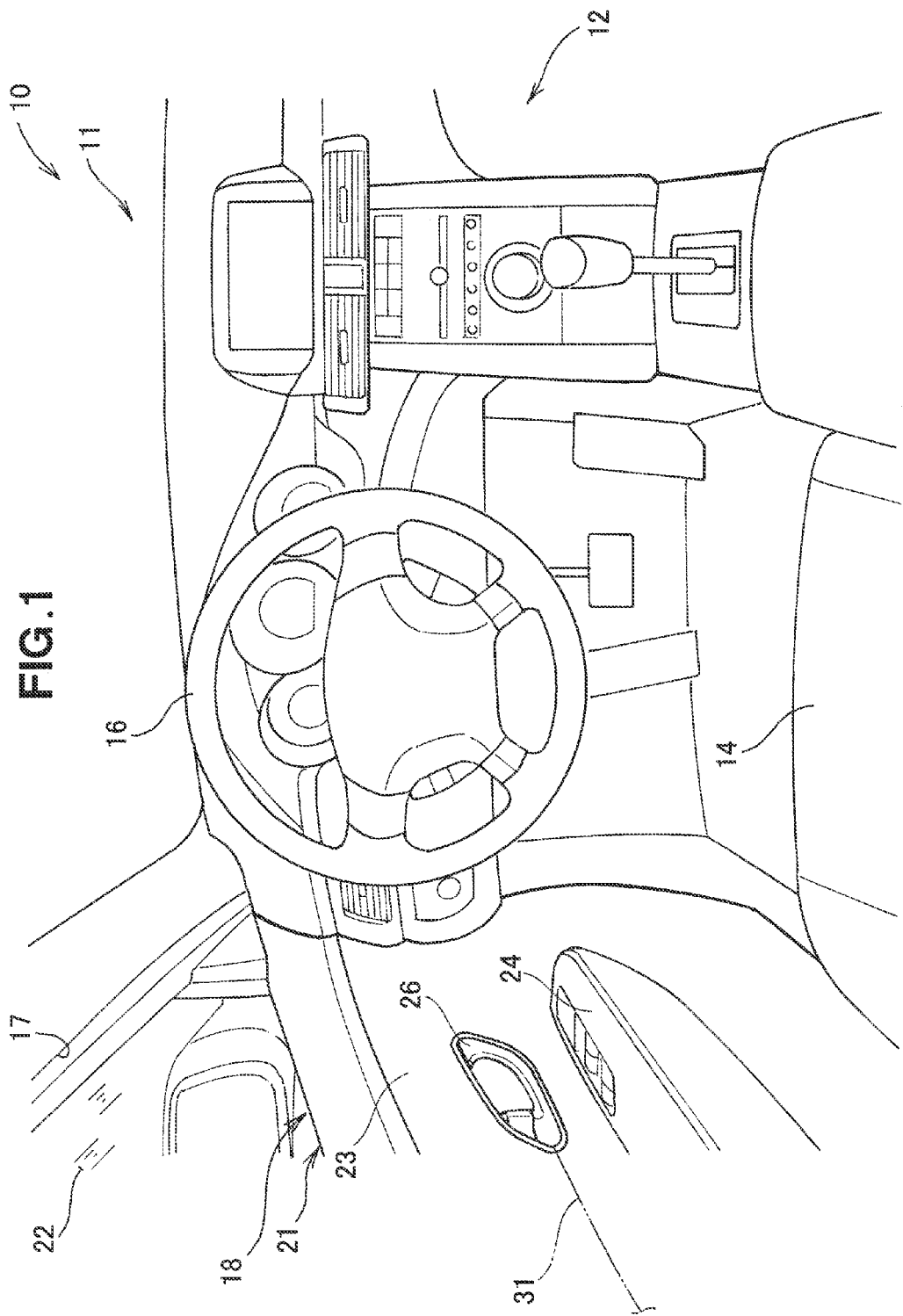
FIG. 1 is a perspective view of a vehicle employing a control cable attachment structure according to the present invention.
Figure 2:
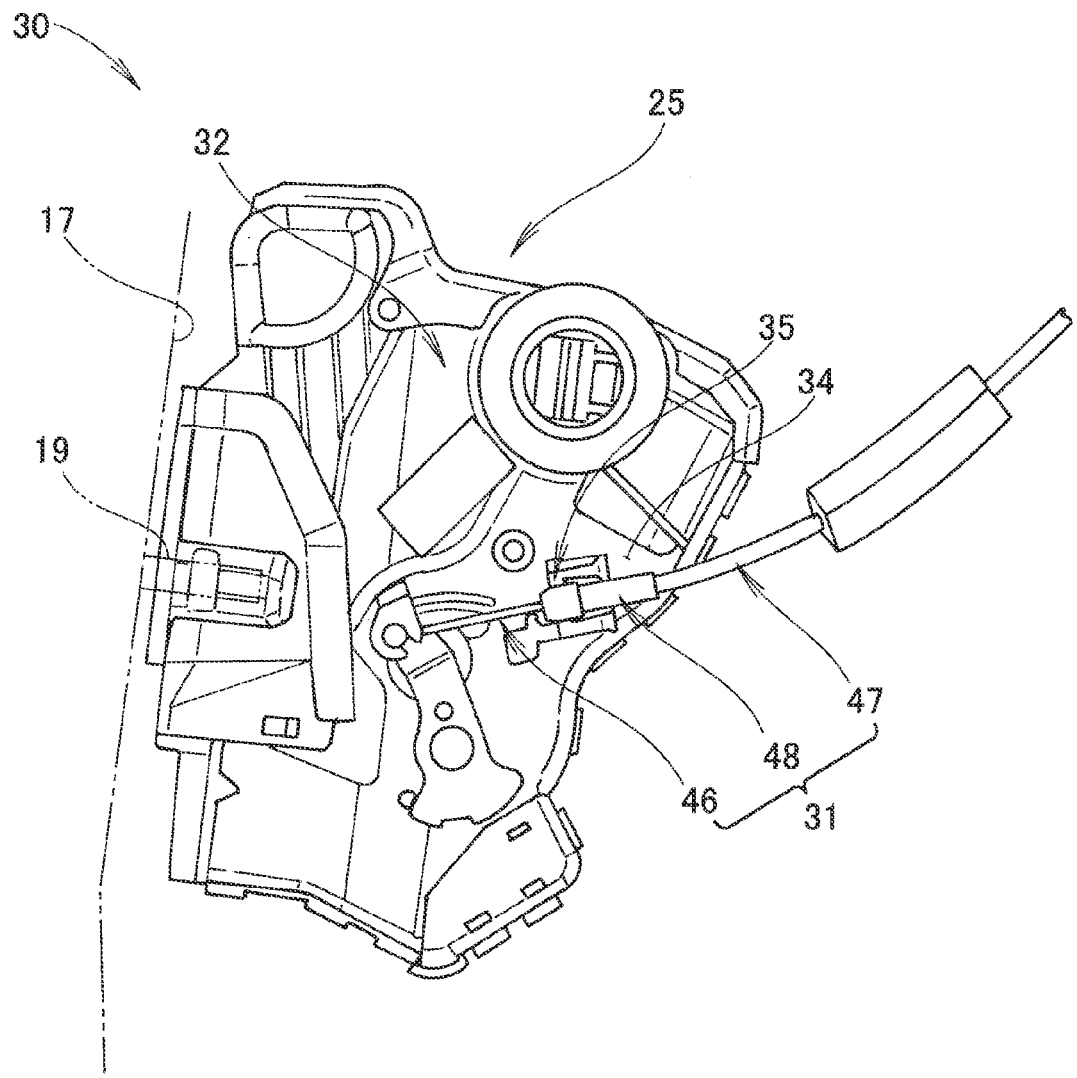
FIG. 2 is a plan view of the control cable attachment structure in an embodiment of the present invention.
Figure 3:
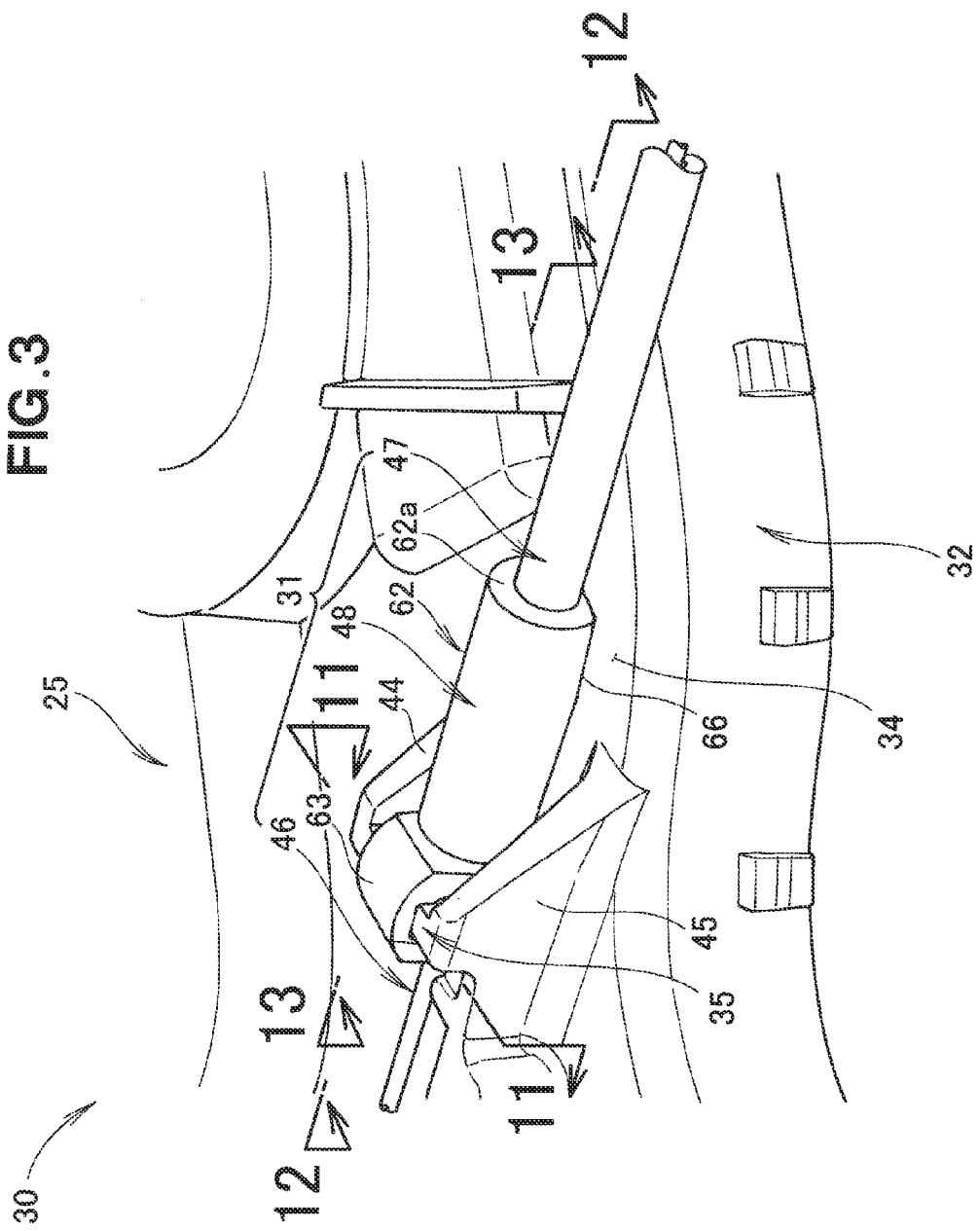
FIG. 3 is a perspective view of the control cable attachment structure shown in FIG. 2.

As shown in FIG. 1 and FIG. 2, a vehicle 10 has a vehicle compartment 12. Within the vehicle compartment 12 are disposed a driver's seat 14 for a driver to sit and a steering wheel 16 for steering front wheels (not shown). The vehicle 10 further includes a door opening portion 17 disposed outwardly of the steering wheel 16 for allowing the driver to get into or out of the vehicle 10, a vehicular door 18 selectively opening and closing the door opening portion 17, and a striker 19 disposed on the door opening portion 17 for locking the door 18.

The door 18 includes a door body 21 attached to a vehicle body 11 for moving between an open position and a closed position, and a door glass 22 vertically movably attached to the door body 21. The door body 21 has a side facing the vehicle compartment 21 and covered with a door lining 23. The door 18 further includes an armrest 24 disposed at a vertically centrally of the door lining 23 and extending in a front-and-rear direction of the vehicle body 11. The door 18 also includes a latch mechanism 25 lockable to the striker 19, an inner door handle 26 for unlocking the latch mechanism 25, and a control cable 31 interconnecting the inner door handle 26 and the latch mechanism 25.

The latch mechanism 25 includes a housing 32 accommodating a latch (not shown). The housing 32 is an anchoring member anchoring the control cable 31 (the housing 32 is hereinafter referred to as "anchoring member 32"). A control cable attachment structure 30 comprises the control cable 31 and the anchoring member 32.

The anchoring member 32 includes a general surface 34 along the control cable 31, and an anchoring plate portion 35 uprising from the general surface 34 and having a shape of substantially flat plate. The anchoring plate portion 35 anchors the control cable 31. The general surface 34 extends in a direction perpendicular to a plane 36 (FIG. 4) of the anchoring plate portion 35.

As shown in FIG. 1 to FIG. 4, the anchoring plate portion 35 has a front surface 36a facing in a direction toward a point of connection between the control cable 31 and the inner door handle 26, and a back surface 36b facing in a direction toward a point of connection between the control cable 31 and the latch mechanism 25. The front surface 36a of the anchoring plate portion 35 slants such that a thickness of the anchoring plate portion 35 increases from one side edge 38 of the anchoring plate portion 35 toward the general surface 34 of the anchoring member 32. The front surface 36a of the anchoring plate portion 35 faces a protruding portion 61 of an attachment part 48 discussed later. The back surface 36b of the anchoring plate portion 35 is oriented perpendicularly to the general surface 34.

In the anchoring plate portion 35, there is formed an attachment groove 39 opened toward a top end provided by the one side edge 38 of the anchoring plate portion 35. The anchoring plate portion 35 is connected to the general surface 34 at a side located oppositely from the one side edge 38. The anchoring plate portion 35 has opposite sides supported by support walls 44, 45. The attachment groove 39 includes an anchoring groove 41 for positioning and anchoring the attachment part 48, and a constricted groove 42 formed between the anchoring groove 41 and the one side edge 38 and having a width smaller than a width of the anchoring groove 41.

Figure 11:
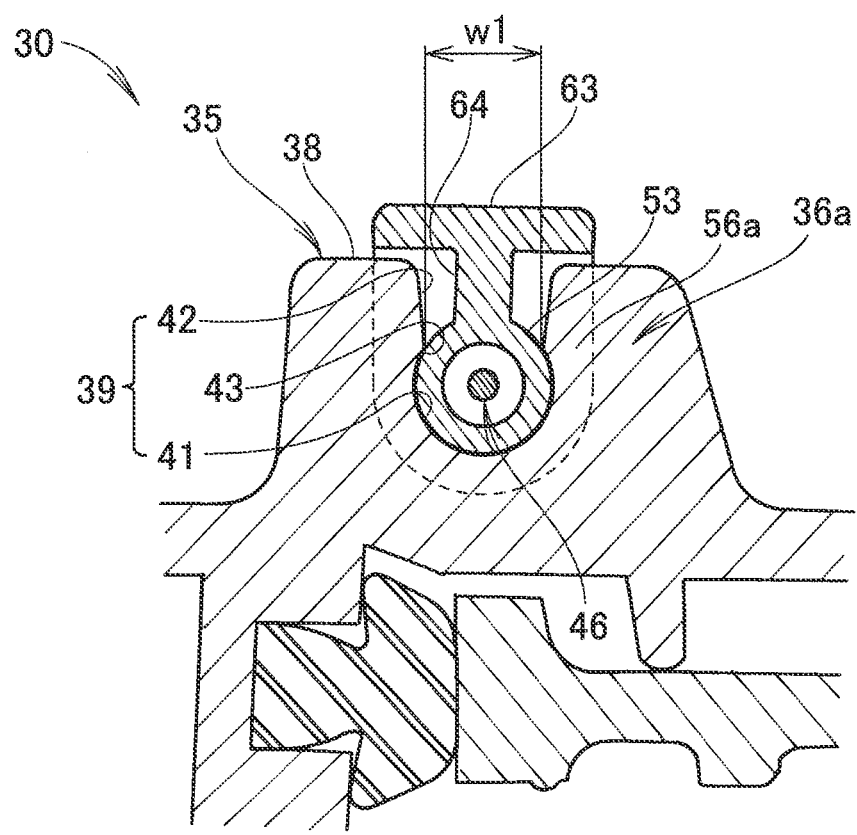
FIG. 11 is a cross-sectional view taken along line 11-11 of FIG. 3.

The constricted groove 42 becomes wider toward the top end (one side edge) 38 of the anchoring plate portion 35. The anchoring groove 41 is located below and contiguous with the constricted groove 42 and has a circular shape opened toward the constricted groove 42. That is, in the constricted groove 42, a contiguity portion (boundary) 43 contiguous with the anchoring groove 41 has the smallest width W1 (FIG. 11).

Figure 4:
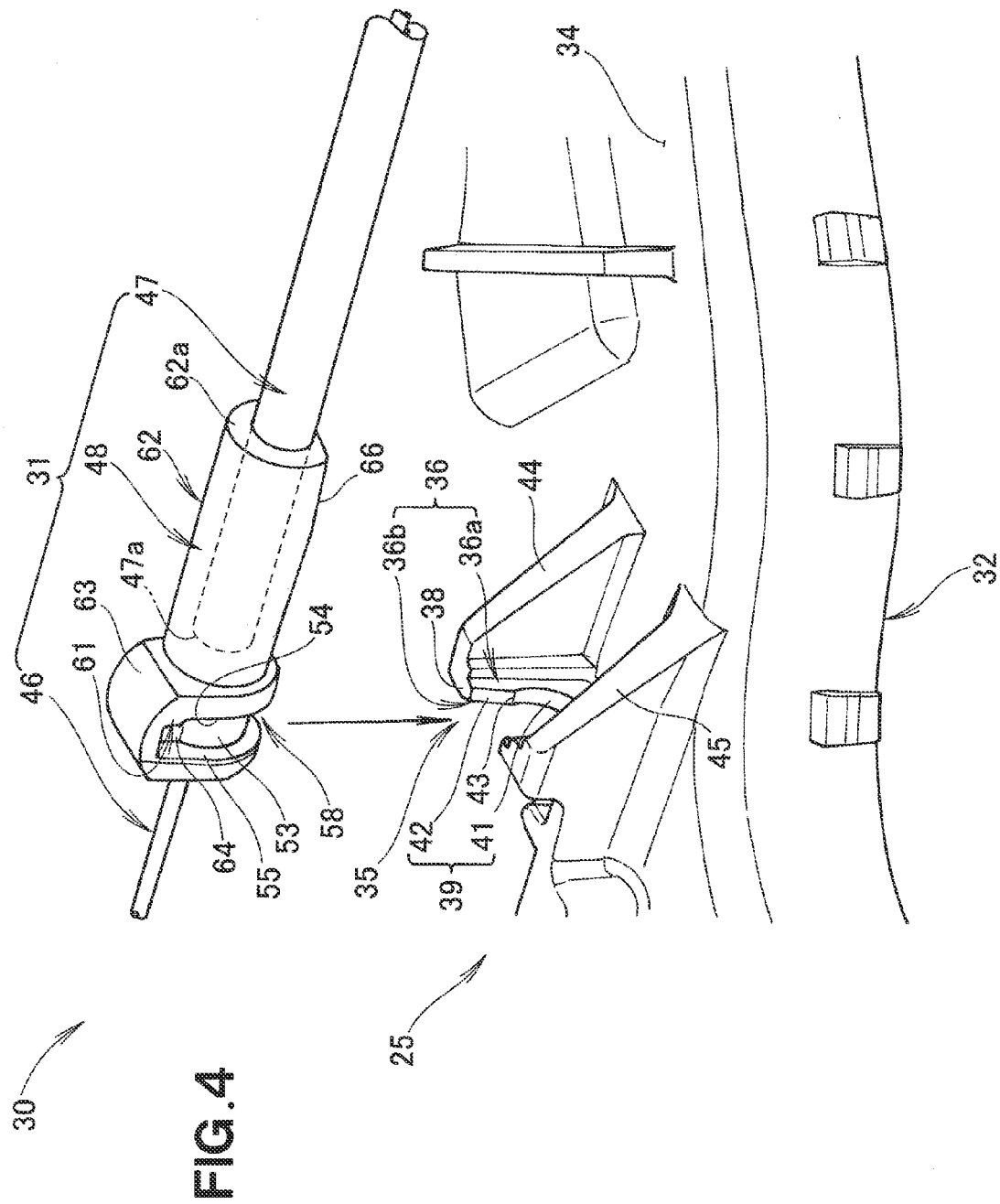
FIG. 4 is an exploded perspective view of the control cable attachment structure shown in FIG. 2.
Figure 5:
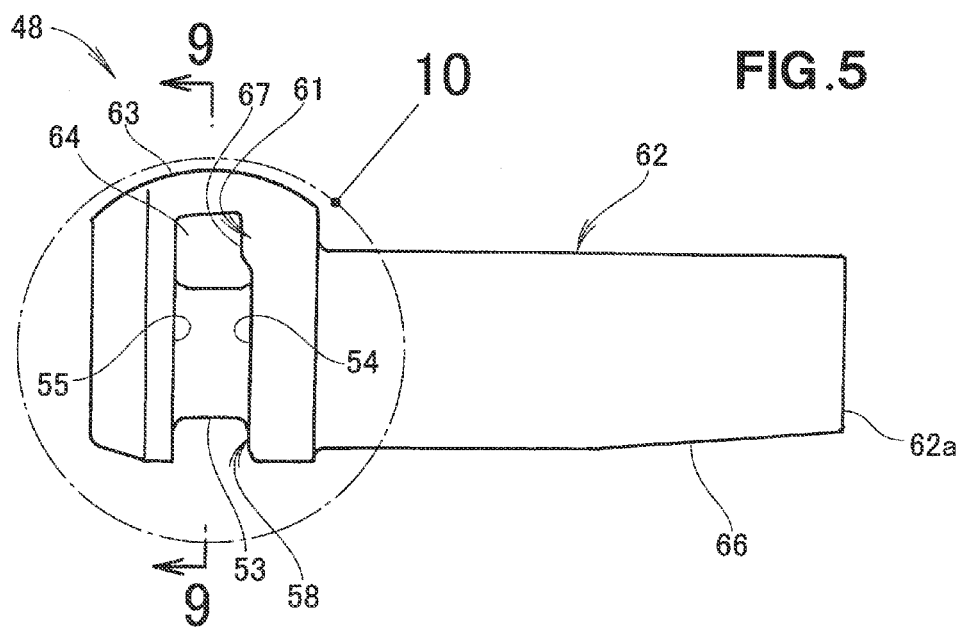
FIG. 5 is a front elevation view of an attachment part (cable cap) shown in FIG. 4.
Figure 6:
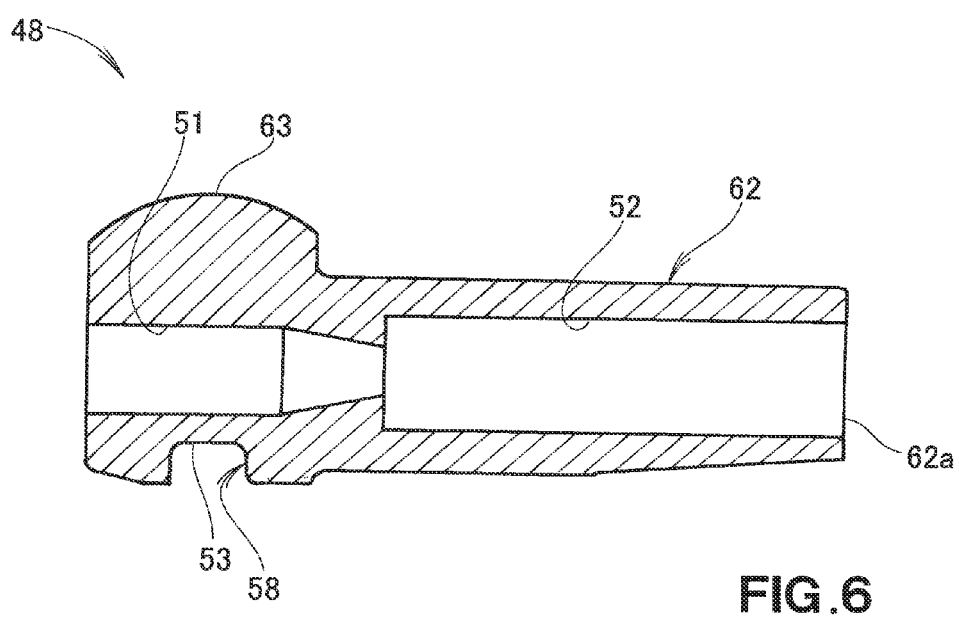
FIG. 6 is a cross-sectional view of the cable cap shown in FIG. 5.
Figure 7:
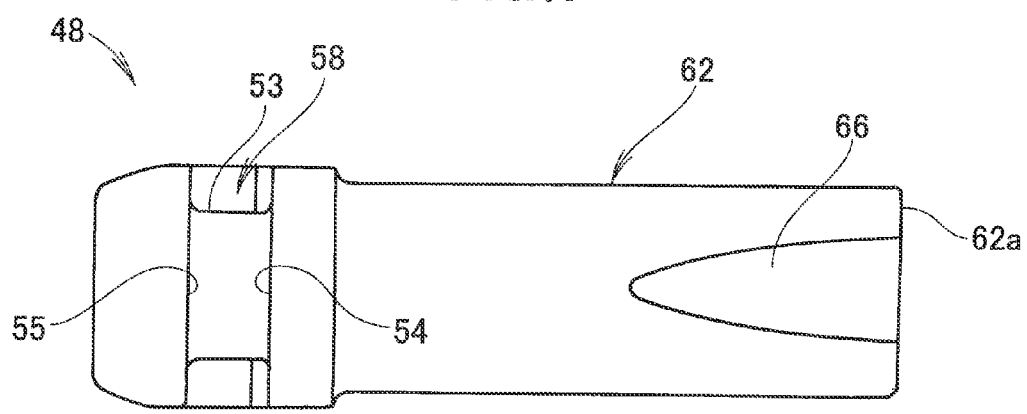
FIG. 7 is a bottom view of the cable cap shown in FIG. 5.
Figure 8:
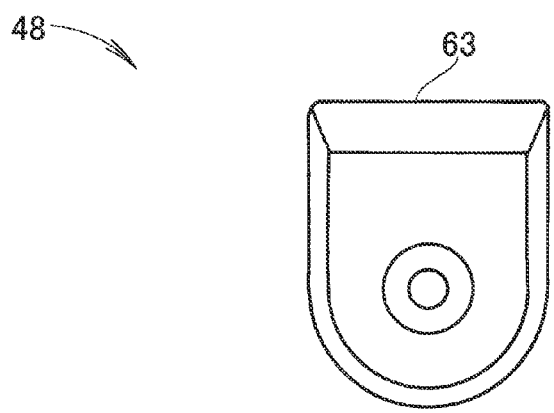
FIG. 8 is a side elevation view of the cable cap shown in FIG. 5.

As shown in FIG. 4, the control cable 31 includes an inner cable 46 formed by a deformable wire, an outer tube 47 through which the inner cable 46 is inserted, and the attachment part (a cable cap) 48 provided on a leading end 47a of the outer tube 47 and in a vicinity of the anchoring member 32. The attachment part 48 is anchored to the anchoring plate portion 35.

As shown in FIG. 4 to FIG. 13, the attachment part (cable cap) 48 has an inner tubular portion 51 through which the inner cable 46 is inserted, and an outer tubular portion 52 through which the outer tube 47 fits into. The attachment part 48 includes an engaged portion 53 of circular cross-section having a diameter larger than the width of the constricted groove 42 (the width W1 of the contiguity portion 43). The engaged portion 53 is engaged with the anchoring groove 41. The attachment part 48 also includes a pair of opposed surfaces 54, 55 protruding from an outer surface of the engaged portion 53 in substantially parallel to each other. The pair of opposed surfaces 54, 55 is opposed to the front and back surfaces 36a, 36b of the anchoring plate portion 35. The attachment part 48 has an engaged groove 58 defined by the pair of opposed surfaces 54, 55 and is engaged with peripheral edges 56a, 56b of the attachment groove 39 of the anchoring plate portion 35. One 54 of the pair of opposed surfaces 54, 55 includes the protruding portion 61 protruding toward the opposite one 55 of the pair of opposed surfaces 54, 55. The protruding portion 61 is located closer to the one side edge 38 than the boundary (contiguity portion) 43 between the constricted groove 42 and the anchoring groove 41. The attachment part 48 further includes an extension portion 62 extending from either one of the one 54 and the opposite one 55 in a direction away from the engaged groove 58 and along the general surface 34. The attachment part 48 further includes a first connection portion 63 located outwardly of the one side edge 38 and interconnecting the pair of opposed surfaces 54, 55. The attachment part 48 further includes a second connection portion 64 interconnecting the pair of opposed surfaces 54, 55. The second connection portion 64 is inserted through the constricted groove 42 with the engaged portion 53 being anchored to the anchoring groove 41.

The peripheral edges 56a, 56b are portions of the front and back surfaces 36a, 36b of the anchoring plate portion 35, which portions engage the engaged groove 58.

In the embodiment, the pair of opposed surfaces 54, 55 includes the one surface 54 facing the point of connection between the control cable 31 and the inner door handle 26, and the opposite surface 55 facing the point of connection between the control cable 31 and the latch mechanism 25 (FIG. 2). In the embodiment, on the one surface 54, there is provided the protruding portion 61 protruding toward the opposite surface 55 and located closer to the one side edge 38 than the boundary (contiguity portion) 43 between the constricted groove 42 and the anchoring groove 41. That is, the protruding portion 61 is provided only on the one surface 54. When attached to the anchoring plate portion 35, the opposite surface 55 is formed along the back surface 36b of the anchoring plate portion 35.

As discussed above, the extension portion 62 extends from the one surface 54 of the opposed surfaces 54, 55 in the direction away from the engaged groove 58 and along the general surface 34. At a distal end 62a of the extension portion 62, there is formed a flat, beveled portion 66. The flat, beveled portion 66 is located only at a side of the distal end 62a facing the general surface 34. On the protruding portion 61, an inclined surface 67 is formed along the slanting surface (the front surface 36a of the anchoring plate portion).

The beveled portion 66 is formed to extend in parallel to the general surface 34 when the distal end 62a of the extension portion 62 tilts toward the general surface 34. Thus, when the distal end 62a tilts toward the general surface 34, the beveled portion 66 abuts on the general surface 34.

Figure 14:
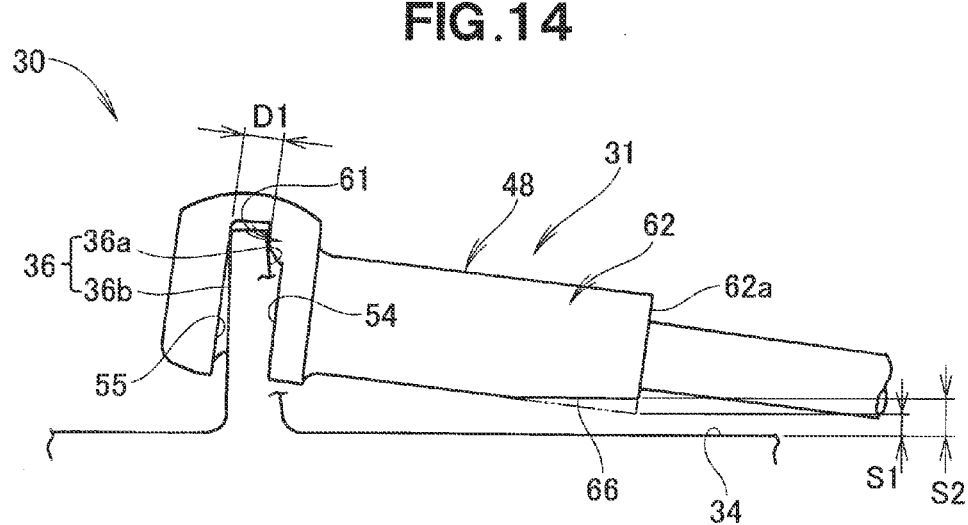
FIG. 14(a) is an elevation view showing the cable cap having a beveled portion in the embodiment of the present invention and FIG. 14(b) is an elevation view showing a cable cap having no beveled portion in a comparative example.
Figure 14:
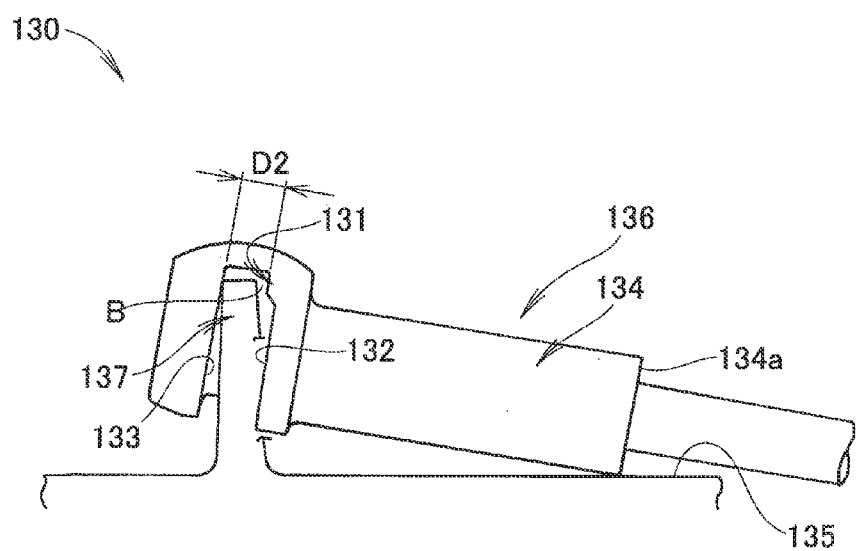

FIG. 14(a) shows the control cable attachment structure 30. In the control cable attachment structure 30, the protruding portion 61 is formed on the one surface 54 of the opposed surfaces 54, 55. A distance D1 between the protruding portion 61 and the opposite surface 55 of the opposed surfaces 54, 55 is set to allow the protruding portion 61 and the opposite surface 55 of the opposed surfaces 54, 55 to come into abutment on the front and back surfaces 36a, 36b of the anchoring plate portion 35, respectively, before the distal end 62a of the extension portion 62 abuts on the general surface 34 when the control cable 31 tilts in such a manner as to bring the distal end 62a close to the general surface 34.

Thus, when the control cable 31 tilts to apply a load to the engaged portion 53 (FIG. 4) in such a direction as to remove the engaged portion 53 from the anchoring groove 41, either the protruding portion 61 or the opposite surface 55 of the opposed surfaces 54, 55 bends the anchoring plate portion 35, producing a friction force therebetween. This friction force assists a retaining force produced only at the engaged portion 53. Thus, it is possible to prevent removal of the engaged portion 53 from the anchoring groove 41 by the tilting of the control cable 31.

In the control cable attachment structure 30, furthermore, the distal end 62a of the extension portion 62 has the flat, beveled portion 66 at the side facing the general surface 34. If there is not the flat, beveled portion 66, the distal end 62a of the extension portion 62 is spaced a distance S1 from the general surface 34 when the protruding portion 61 and the opposite surface 55 of the opposed surfaces 54, 55 abut on the front and back surfaces 36a, 36b of the anchoring plate portion 35, respectively.

If there is the flat, beveled portion 66, the distal end 62a is spaced a distance S2 from the general surface 34 when the protruding portion 61 and the opposite surface 55 of the opposed surfaces 54, 55 abut on the front and back surfaces 36a, 36b of the anchoring plate portion 35, respectively. That is, the distance S2>the distance S1. The provision of the flat, beveled portion 66 at the side of the distal end 62 facing the general surface 34 makes a distance between the distal end 62a and the general surface 34 so great as to prevent the distal end 62a from abutting on the general surface 34.

FIG. 14(b) shows a control cable attachment structure 130 in a comparative example. In the control cable attachment structure 130, a protruding portion 131 is formed on one (one surface) 132 of opposed surfaces. A distance D2 between the protruding portion 131 and an opposite one (an opposite surface) 133 of the opposed surfaces is set to provide a gap B between the protruding portion 131 and the opposite surface 133 even with a distal end 134a of an extension portion 134 abutting on an general surface 135 when a control cable 136 tilts in such a manner as to bring the distal end 134a of the extension portion 134 close to the general surface 135.

That is, there is no friction force produced by either the opposite surface 133 of the opposed surfaces or the protruding portion 131 bending an anchoring plate 137 when the control cable 136 tilts. Therefore, the control cable attachment structure 130 in the comparative example produces a less retaining force than the control cable attachment structure 30.

As shown in FIG. 15(a), in the control cable attachment structure 30, an upward load A is applied to a point on the outer tube 47, which point is located a distance L from the protruding portion 61, a bending moment whose magnitude is equivalent to LA is applied to the engaged portion 53 and the anchoring groove 41 (FIG. 4). This moment acts as a removing force to remove the engaged portion 53 (FIG. 4) from the anchoring groove 41. At this time, the engaged portion 53 rubs against the anchoring plate portion 35 to generate a friction therebetween. Additionally, either the opposite surface 55 of the opposed surfaces 54, 55 or the protruding portion 61 bends the anchoring plate portion 35, producing a friction force therebetween. The friction force assists a retaining force generated only at the engaged portion 53.

As shown in FIG. 15(b), in the control cable attachment structure 30, when a downward load A is applied to a point of the outer tube 47, which point is located a distance L from the protruding portion 61, a bending moment whose magnitude is equivalent to LA is applied to the engaged portion 53 and the anchoring groove 41 (FIG. 4). This moment acts as a removing force to remove the engaged portion 53 from the anchoring groove 41. At this time, the engaged portion 53 rubs against the anchoring plate portion 35 to generate a friction therebetween. Additionally, either the opposite surface 55 of the opposed surfaces 54, 55 or the protruding portion 61 bends the anchoring plate portion 35, producing a friction force therebetween. This friction force assists a retaining force generated only at the engaged portion 53.

As shown in FIG. 15(c), in the control cable attachment structure 30, a downward load A is applied to a point on the outer tube 47 spaced a distance L from the protruding portion 61 (FIG. 4), until the distal end 62a of the extension portion 62 abuts on the general surface 34. In this regard, a distance between the point to which the load A is applied and the distal end 62a is designated at L1, and a distance between the protruding portion 61 and the distal end 62a of the extension portion 62 is designated at L2.

When the distal end 62a of the extension portion 62 abuts on the general surface 34 of the anchoring member 32, the distal end 62a of the extension portion 62 acts as a fulcrum such that a load whose magnitude is equivalent to L1/L2·A is applied to the engaged portion 53 (FIG. 4) and the anchoring groove 41 in accordance with the "principle of the lever", thereby making it easier to remove the engaged portion 53 from the anchoring groove 41.

Turning to FIG. 4, a distance between the protruding portion 61 and the opposite surface 55 of the opposed surfaces 54, 55 is set such that the protruding portion 61 and the opposite surface 55 of the opposed surfaces 54, 55 abut on the front and back surfaces 36a, 36b of the anchoring plate portion 35, respectively, before the distal end 62a of the extension portion 62 abuts on the general surface 34 when the control cable 31 tilts in such a manner as to bring the distal end 62a of the extension portion 62 close to the general surface 34.

Thus, either the protruding portion 61 or the opposite surface 55 of the opposed surfaces 54, 55 bends the anchoring plate portion 35, producing the friction force therebetween even when the distal end 62a of the extension portion 62 acts as a fulcrum to apply a load to the engaged portion 53 and the anchoring groove 41 in such a direction as to remove the engaged portion 53 from the anchoring groove 41 in accordance with the "principle of the lever". This friction force assists a retaining force produced only at the engaged portion 53. Thus, it is possible to prevent removal of the engaged portion 53 from the anchoring groove 41 by tilting of the control cable 31 to apply the load to the engaged portion 53 in accordance with the "principle of the lever".

As shown in FIG. 16(a), when an upward load B is applied to an outer tube 47A fitting into an attachment part 48A having no protruding portion 61 (see FIG. 16(c)), a gap is formed on a side of one surface 54A of opposed surfaces, and hence a lower end 57A of an opposite surface 55A of the opposed surfaces firstly abuts on the back surface 36b of the anchoring plate portion 35. As a result, the attachment part 48A pivots on the lower end 57A of the opposite surface 55A of the opposed surfaces, as indicated by an arrow e1.

FIG. 16(b) is a cross-sectional view taken along line b-b of FIG. 16(a). As shown in FIG. 16(a) and FIG. 16(b), an engaged portion 53A is subjected to a load in a direction toward the constricted groove 42 to remove the engaged portion 53A, as indicated by arrows e2, e3.

In the control cable attachment structure 30, as shown in FIG. 16(c), the protruding portion 61 on the one surface 54 of the opposed surfaces 54, 55 firstly abuts on the front surface 36a of the anchoring plate portion 35 when an upward load B is applied to the outer tube 47. The attachment part 48 then pivots on the protruding portion 61 on the one surface 54, as indicated by an arrow e4.

FIG. 16(d) is a cross-sectional view taken along line d-d of FIG. 16(c). As shown in FIG. 16(c) and FIG. 16(d), the engaged portion 53 of the attachment part 48 is subjected to a load in a direction away from the constricted groove 42 to depress the engaged portion 53, as indicated by arrows e5, e6.

That is, as shown in FIG. 16(a) to FIG. 16(d), when the upward load B is applied to the outer tube 47, whether a load is applied to the engaged portion 53 or 53A in a direction toward or away from the constricted groove 42 depends upon whether or not there is the protruding portion 61. In the control cable attachment structure 30, since the engaged portion 53 is subjected to the load in a direction away from the constricted groove 42 to depress the engaged portion 53, the engaged portion 53 produces a greater retaining force than if there is not the protruding portion 61.

As shown in FIG. 4, the control cable attachment structure 30 includes the control cable 31 having the inner cable 46 and the outer tube 47 through which the inner cable 46 is inserted, and the anchoring member 32 anchoring the attachment part 48 provided on the leading end 47a of the outer tube 47.

The anchoring member 32 includes the anchoring plate portion 35 having the shape of the substantially flat plate, and the attachment groove 39 extending through the anchoring plate portion 35 in the direction perpendicular to the plane 36 of the anchoring plate portion 35 and opened toward the one side edge 38 of the anchoring plate portion 35. The attachment groove 39 includes the anchoring groove 41 positioning and anchoring the attachment part 48, and the constricted groove 42 formed between the anchoring groove 41 and the one side edge 38 and having the width smaller than the width of the anchoring groove 41.

As shown in FIG. 4 and FIGS. 11 to 13, the attachment part 48 includes the engaged portion 53 engaged with the anchoring groove 41 and having the width larger than the width of the constricted groove 42 (the width W1 of the contiguity portion 43). The attachment part 48 also includes the pair of opposed surfaces 54, 55 protruding from the outer surface of the engaged portion 53 in substantially parallel to each other and opposed to the front and back surfaces 36a, 36b of the anchoring plate portion 35, respectively. The attachment part 48 further includes the engaged groove 58 defined by the pair of opposed surfaces 54, 55 and engaged with the peripheral edges 56a, 56b of the attachment groove 39 of the anchoring plate portion 35.

The one surface 54 of the opposed surfaces 54, 55 includes the protruding portion 61 protruding toward the opposite surface 55 of the opposed surfaces 54, 55, and the protruding portion 61 is located closer to the one side edge 38 of the anchoring plate portion 35 than the boundary 43 between the constricted groove 42 and the anchoring groove 41. The engaged groove 58 has a smaller width D1 at the protruding portion 61 than at locations other than the protruding portion 61, such that, when the control cable 31 tilts, the attachment part 48 (more particularly, the protruding portion 61 and the opposite surface 55 of the opposed surfaces 54, 55) abut on the anchoring plate portion 35 above the boundary between the constricted groove 42 and the anchoring groove 41 (above a location of the attachment part 48 where the engaged portion 53 is anchored to the anchoring groove 41).

That is, when the control cable 31 tilts to apply a load to the engaged portion 53 in such a direction as to remove the engaged portion 53 from the anchoring groove 41, either the protruding portion 61 or the opposite surface 55 of the opposed surfaces 54, 55 bends the anchoring plate portion 35, producing the friction force therebetween. This friction force assists a retaining force produced only at the engaged portion 53. Thus, it is possible to prevent removal of the engaged portion 53 from the anchoring groove 41 by the tilting of the control cable 31. Furthermore, the control cable attachment structure 30 is simplified because the one surface 54 of the opposed surfaces 54, 55 is merely provided with the protruding portion 61 protruding toward the opposite surface 55 of the opposed surfaces 54, 55 and located closer to the one side edge 38 than the boundary between the constricted groove 42 and the anchoring groove 41.

As shown in FIG. 4, the anchoring member 32 includes the general surface 34 extending perpendicularly to the plane 36 of the anchoring plate portion 35. The anchoring plate portion 35 is connected to the general surface 34 at the side thereof located oppositely from the one side edge 38. The attachment part 48 further includes the extension portion 62 extending from either the one surface 54 or the opposite surface 55 in the direction away from the engaged groove 58 and along the general surface 34.

Figure 12:
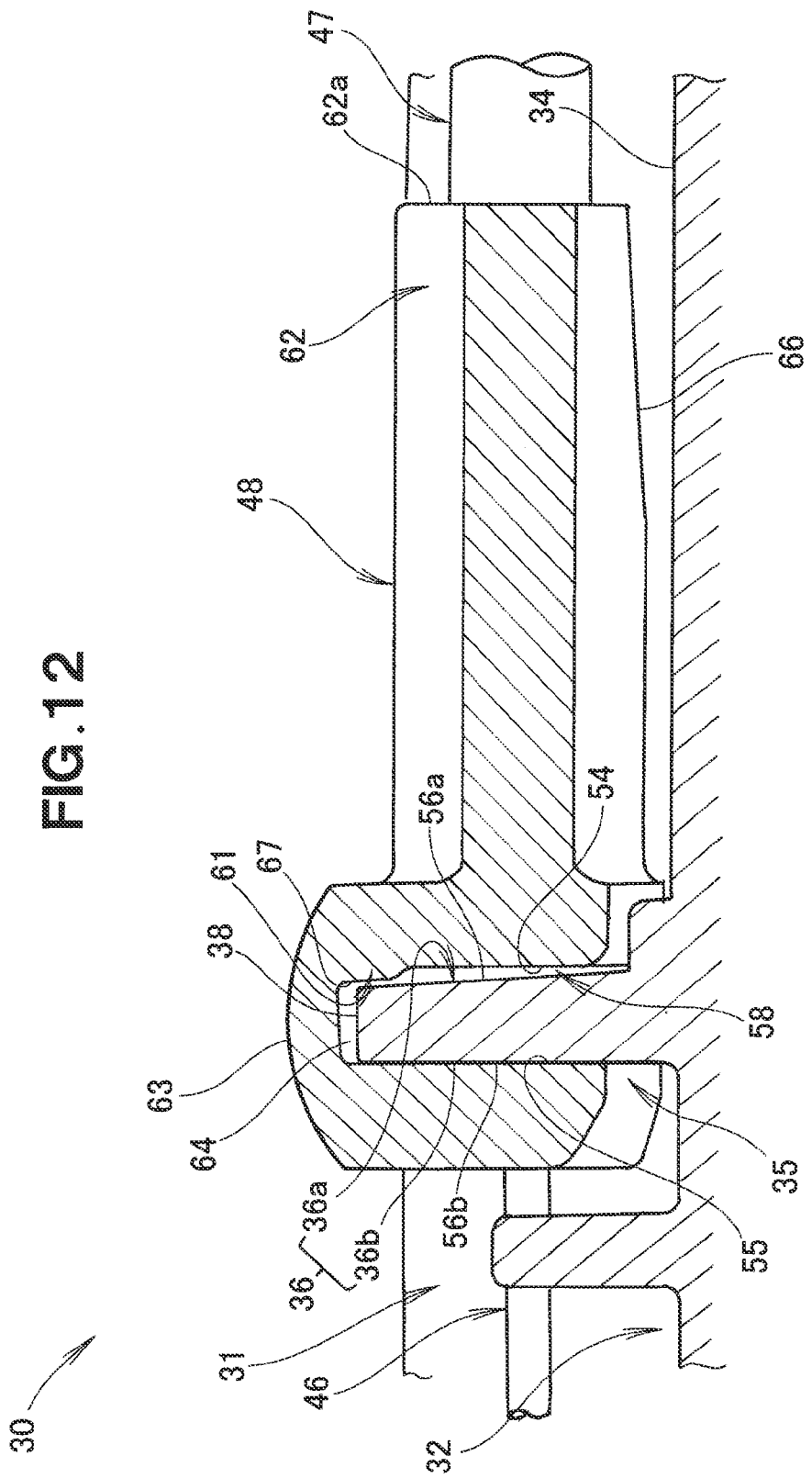
FIG. 12 is a cross-sectional view taken along line 12-12 of FIG. 3.
Figure 13:
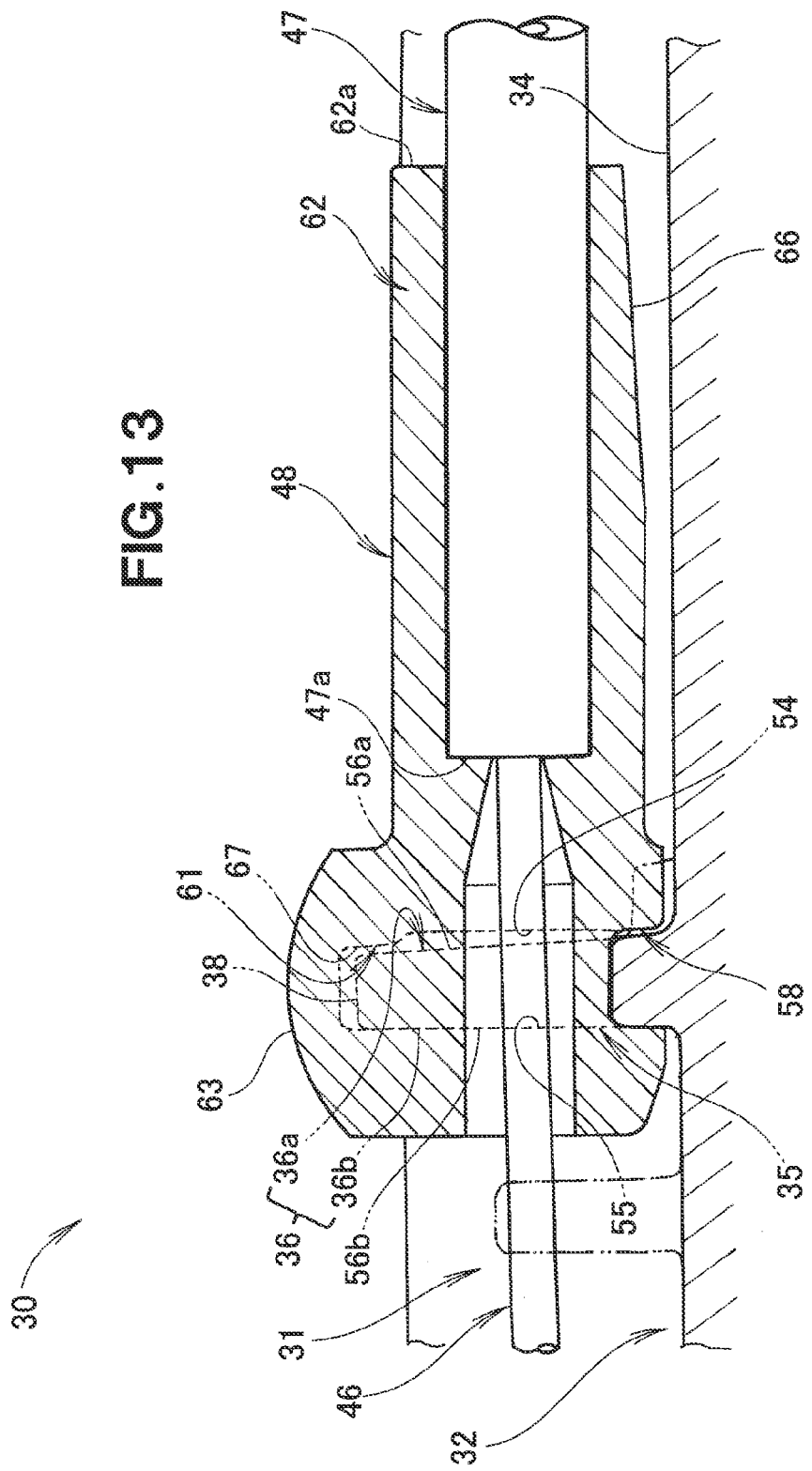
FIG. 13 is a cross-sectional view taken along line 13-13 of FIG. 3.

As shown in FIG. 12, FIG. 13 and FIG. 15(c), the protruding portion 61 is formed on the one surface 54 of the opposed surfaces 54, 55. The distance between the protruding portion 61 and the opposite surface 55 of the opposed surfaces is set to allow the protruding portion 61 and the opposite surface 55 of the opposed surfaces 54, 55 to come into abutment on the front and back surfaces 36a, 36b of the anchoring plate portion 35, respectively, before the distal end 62a of the extension portion 62 abuts on the general surface 34 when the control cable 31 tilts in such a manner as to bring the distal end 62a of the extension portion 62 close to the general surface 34.

Even when the distal end 62a of the extension portion 62 abuts on the general surface 34 and acts as a fulcrum to apply a load to the engaged portion 53 in such a direction as to remove the engaged portion 53 from the anchoring groove 41 in accordance with the "principle of the lever", either the opposite surface 55 of the opposed surfaces 54, 55 or the protruding portion 61 bends the anchoring plate portion 35, producing the friction force therebetween. This friction force assists a retaining force produced only at the engaged portion 53. Thus, it is possible to prevent removal of the engaged portion 53 form the anchoring groove 41 by tilting the control cable 31 to apply the load to the engaged portion 53 in accordance with the "principle of the lever".

As shown in FIG. 12, since the flat, beveled portion 66 is formed only at the side of the distal end 62a facing the general surface 34, a distance between the distal end 62a and the general surface 34 is so great as to prevent the distal end 62a from abutting on the general surface 34. Even if the distal end 62a abuts on the general surface 34, the distal end 62a contacts the general surface 34 along a line or surface of the distal end 62a such that a load applied to the extension portion 62 through the outer tube 47 may be easily transmitted to the general surface 34, thereby reducing a force produced in accordance with the "principle of the lever".

Since the distal end 62a of the extension portion 62 is beveled only at the side facing the general surface 34, reduction in rigidity of the distal end 62a can be minimized.

As shown in FIG. 12 and FIG. 13, the front surface 36a of the anchoring plate portion 35 faces the protruding portion 61 and slants such that the anchoring plate portion 35 has a thickness increasing from the one side edge 38 toward the general surface 34. The front surface 36a facing the protruding portion 61 slants in such a manner as to allow insertion of the control cable 31, thereby eliminating concern that the control cable 31 can be less smoothly inserted with the protruding portion 61 being caught on a tip of the anchoring plate portion 35.

Figure 10:
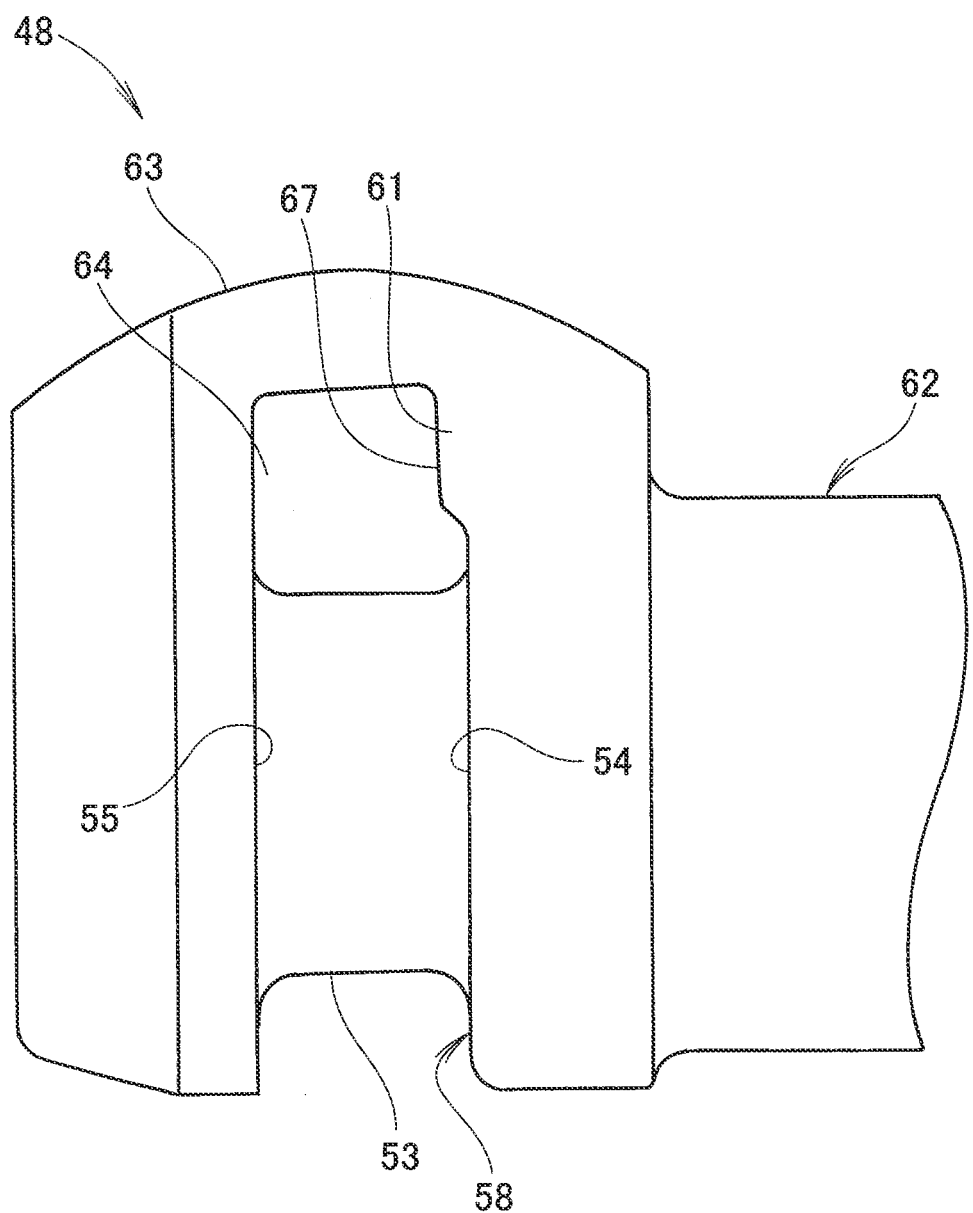
FIG. 10 is an enlarged view of a region indicated at 10 in FIG. 5.

As shown in FIG. 10 and FIG. 12, the protruding portion 61 has the inclined surface 67 along the slanting front surface 36a to lessen a clearance defined between the anchoring plate portion 35 and the protruding portion 61. The protruding portion 61 can contact the slanting front surface 36a along the inclined surface 67, such that the protruding portion 61 can bend the anchoring plate portion 35, producing a greater friction force therebetween. The production of this greater friction force increases the retaining force during tilting of the control cable 31.

As shown in FIG. 12 and FIG. 13, in the control cable attachment structure 30, the attachment part 48 includes the first connection portion 63 located outwardly of the one side edge 38 and interconnecting the pair of opposed surfaces 54, 55. The first connection portion 63 prevents the pair of opposed surfaces 54, 55 from moving away from each other. The presence of the first connection portion 63 makes it easier to identify which direction of insertion of the attachment part 48 into the anchoring groove 41, thereby improving workability in attaching the control cable 31.

Figure 9:
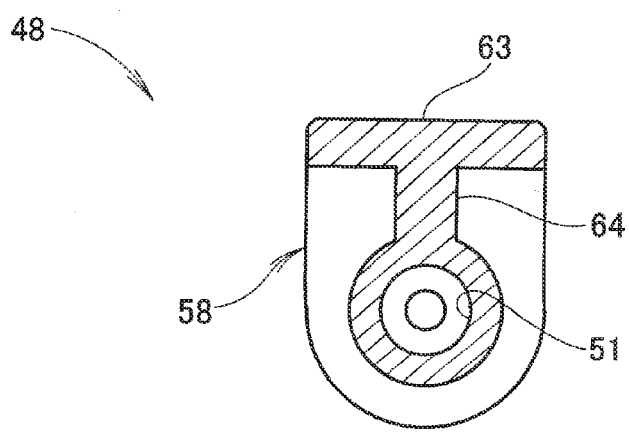
FIG. 9 is a cross-sectional view taken along line 9-9 of FIG. 5.

As shown in FIG. 9 and FIG. 10, the attachment part 48 includes the second connection portion 64 interconnecting the pair of opposed surfaces 54, 55 and inserted through the constricted groove 42 with the engaged portion 53 being anchored to the anchoring groove 41. The second connection portion 64 prevents the pair of opposed surfaces 54, 55 from moving away from each other. The second connection portion 64 also prevents the control cable 31 from rotating.

Although the one surface 54 of the opposed surfaces 54, 55 has the protruding portion 61 protruding toward the opposite surface 55 of the opposed surfaces 54, 55 and located closer to the one side edge 38 than the boundary between the constricted groove 42 and the anchoring groove 41, as shown in FIG. 12, the opposite surface 55 of the opposed surfaces 54, 55 may have a protruding portion or both of the opposed surfaces 54, 55 may have protruding portions.

Although the front surface 36a faces the point of connection between the control cable 31 and the inner door handle 26, and the back surface 36b faces the point of connection between the control cable 31 and the latch mechanism 25, as shown in FIG. 12, the front surface 36a may face the point of connection between the control cable 31 and the latch mechanism 25, and the back surface 36b faces the point of connection between the control cable 31 and the inner door handle 26.

INDUSTRIAL APPLICABILITY

The control cable attachment structure according to the present invention is preferably used in an automobile including a control cable having an inner cable and an outer tube, an attachment part provided on a leading end of the outer tube, and an anchoring member anchoring the attachment part thereto.

REFERENCE SIGNS LIST

30 . . . control cable attachment structure, 31 . . . control cable, 32 . . . anchoring member, 34 . . . general surface, 35 . . . anchoring plate portion, 36 . . . plane, 36a . . . slanting front surface 36b . . . back surface, 38 . . . one side edge, 39 . . . attachment groove, 41 . . . anchoring groove, 42 . . . constricted groove, 43 . . . boundary, 46 . . . inner cable, 47 . . . outer tube, 47a . . . leading end, 48 . . . attachment part, 53 . . . engaged portion, 54 . . . one surface, 55 . . . opposite surface, 56a, 56b . . . peripheral edges, 58 . . . engaged groove, 61 . . . protruding portion, 62 . . . extension portion, 62a . . . distal end, 63 . . . first connection portion, 64 . . . second connection portion, 66 . . . beveled portion, 67 . . . inclined surface

The invention claimed is:

1. A control cable attachment structure comprising:
a control cable comprising an outer tube and an inner cable inserted through the outer tube; and
an anchoring member anchoring an attachment part provided on a leading end of the outer tube;
the anchoring member comprising an anchoring plate portion having a shape of a substantially flat plate, and an attachment groove extending through the anchoring plate portion in a direction perpendicular to a plane of the anchoring plate portion, the attachment groove being opened toward one side edge of the anchoring plate portion, the attachment groove comprising an anchoring groove positioning and anchoring the attachment part, and a constricted groove formed between the anchoring groove and the one side edge of the anchoring plate portion, the constricted groove having a width smaller than a width of the anchoring groove;

the attachment part comprising an engaged portion engaged with the anchoring groove and having a dimension larger than the width of the constricted groove, a pair of opposed surfaces protruding from an outer surface of the engaged portion, the pair of opposed surfaces being substantially parallel to each other, the pair of opposed surfaces being opposed to front and back surfaces of the anchoring plate portion, and an engaged groove defined by the pair of opposed surfaces and engaged with peripheral edges of the attachment groove of the anchoring plate portion, wherein at least one of the pair of opposed surfaces includes a protruding portion protruding toward an opposite one of the pair of opposed surfaces, the protruding portion being located closer to the one side edge of the anchoring plate portion than a boundary between the constricted groove and the anchoring groove, wherein the anchoring member includes a general surface extending in a direction perpendicular to the plane of the anchoring plate portion, and the anchoring plate portion is connected to the general surface at a side thereof located oppositely from the one side edge, wherein the attachment part further includes an extension portion extending from either one of the pair of opposed surfaces or the opposite one of the pair of opposed surfaces in a direction away from the engaged groove and along the general surface, the protruding portion being formed on the one of the pair of opposed surfaces, and wherein a distance between the protruding portion and the opposite one of the pair of opposed surfaces is set to allow the protruding portion and the opposite one of the pair of opposed surfaces to come into abutment on the front and back surfaces of the anchoring plate portion, respectively, before a distal end of the extension portion abuts on the general surface when the control cable tilts in such a manner as to bring the distal end of the extension portion close to the general surface.

2. The structure of claim 1, wherein the distal end of the extension portion has a flat, beveled portion only at a side thereof facing the general surface.

3. The structure of claim 2, wherein the front surface of the anchoring plate portion faces the protruding portion and slants such that the anchoring plate portion has a thickness increasing from the one side edge toward the general surface.

4. The structure of claim 2, wherein the attachment part includes a first connection portion located outwardly of the one side edge and interconnecting the pair of opposed surfaces.

5. The structure of claim 2, wherein the attachment part includes a connection portion interconnecting the pair of opposed surfaces and inserted through the constricted groove with the engaged portion being anchored to the anchoring groove.

6. The structure of claim 1, wherein the front surface of the anchoring plate portion faces the protruding portion and slants such that the anchoring plate portion has a thickness increasing from the one side edge toward the general surface.

7. The structure of claim 6, wherein the attachment part includes a first connection portion located outwardly of the one side edge and interconnecting the pair of opposed surfaces.

8. The structure of claim 6, wherein the attachment part includes a connection portion interconnecting the pair of opposed surfaces and inserted through the constricted groove with the engaged portion being anchored to the anchoring groove.

9. The structure of claim 6, wherein the protruding portion has an inclined surface along the slanting front surface.

10. The structure of claim 9, wherein the attachment part includes a first connection portion located outwardly of the one side edge and interconnecting the pair of opposed surfaces.

11. The structure of claim 9, wherein the attachment part includes a connection portion interconnecting the pair of opposed surfaces and inserted through the constricted groove with the engaged portion being anchored to the anchoring groove.

12. The structure of claim 1, wherein the attachment part includes a first connection portion located outwardly of the one side edge and interconnecting the pair of opposed surfaces.

13. The structure of claim 12, wherein the attachment part includes a second connection portion interconnecting the pair of opposed surfaces and inserted through the constricted groove with the engaged portion being anchored to the anchoring groove.

14. The structure of claim 1, wherein the attachment part includes a connection portion interconnecting the pair of opposed surfaces and inserted through the constricted groove with the engaged portion being anchored to the anchoring groove.

15. The structure of claim 1, wherein the attachment part includes a first connection portion located outwardly of the one side edge and interconnecting the pair of opposed surfaces.

16. A control cable attachment structure comprising:
a control cable comprising an outer tube and an inner cable inserted through the outer tube; and
an anchoring member anchoring an attachment part provided on a leading end of the outer tube;
the anchoring member comprising an anchoring plate portion having a shape of a substantially flat plate, and an attachment groove extending through the anchoring plate portion in a direction perpendicular to a plane of the anchoring plate portion, the attachment groove being opened toward one side edge of the anchoring plate portion, the attachment groove comprising an anchoring groove positioning and anchoring the attachment part, and a constricted groove formed between the anchoring groove and the one side edge of the anchoring plate portion, the constricted groove having a width smaller than a width of the anchoring groove;
the attachment part comprising an engaged portion engaged with the anchoring groove and having a dimension larger than the width of the constricted groove, a pair of opposed surfaces protruding from an outer surface of the engaged portion, the pair of opposed surfaces being substantially parallel to each other, the pair of opposed surfaces being opposed to front and back surfaces of the anchoring plate portion, and an engaged groove defined by the pair of opposed surfaces and engaged with peripheral edges of the attachment groove of the anchoring plate portion,
wherein at least one of the pair of opposed surfaces includes a protruding portion protruding toward an opposite one of the pair of opposed surfaces, the protruding portion being located closer to the one side edge of the anchoring plate portion than a boundary between the constricted groove and the anchoring groove, wherein when the control cable tilts, the protruding portion abuts on one of the front and back surfaces of the anchoring plate portion in a longitudinal direction of the control cable, and the one of the pair of opposed surfaces facing the one of the front and back surfaces of the anchoring plate portion, and wherein a distance between the pair of opposed surfaces extending in the longitudinal direction of the control cable is longer than a distance between the protruding portion and the opposite one of the pair of opposed surfaces extending in the longitudinal direction of the control cable.

* * * * *